United States Patent
Ford et al.

(10) Patent No.: US 7,861,442 B2
(45) Date of Patent: Jan. 4, 2011

(54) FOOD-PRODUCT PREPARATION KIT, FOOD-PRODUCT PREPARATION APPARATUS, AND METHODS OF USE

(75) Inventors: Russell H. Ford, Seattle, WA (US); Marion L. Ford, Seattle, WA (US); Larry A. Balley, Jr., Jacksonville, NC (US)

(73) Assignee: Ravensforge Coneg, LLC., Seattle, WA (US)

( * ) Notice: Subject to any disclaimer, the term of this patent is extended or adjusted under 35 U.S.C. 154(b) by 203 days.

(21) Appl. No.: 12/079,201

(22) Filed: Mar. 24, 2008

(65) Prior Publication Data

US 2009/0238936 A1     Sep. 24, 2009

(51) Int. Cl.
G09F 1/10    (2006.01)
(52) U.S. Cl. .......................... 40/124.4; 40/657; 211/42
(58) Field of Classification Search ................ 40/124.4, 40/673, 124, 735, 657, 720, 770, 757, 759; 99/450.5, 448; 211/85.4, 42, 43; 248/450, 248/441.1; 426/132
See application file for complete search history.

(56) References Cited

U.S. PATENT DOCUMENTS

| | | | |
|---|---|---|---|
| D1,043 S * | 8/1858 | Waterman | .................... D7/357 |
| 59,732 A | 11/1866 | West | |
| 114,766 A | 5/1871 | Collins | |
| 133,923 A * | 12/1872 | Cook | ......................... 312/283 |
| 463,590 A | 11/1891 | Zoeggele et al. | |
| 1,020,004 A | 3/1912 | Wishman | |
| 1,362,178 A | 12/1920 | Pfeil et al. | |
| 1,663,719 A | 3/1928 | Morley | |
| 1,716,891 A | 6/1929 | Icre | |
| 1,745,592 A | 2/1930 | White | |
| 2,326,546 A | 8/1943 | McDonald | |
| 2,547,359 A * | 4/1951 | Bacharach | .................. 446/147 |
| 2,810,338 A | 10/1957 | Dawson | |
| 3,272,183 A * | 9/1966 | Craighead et al. | ........... 248/453 |
| D207,406 S * | 4/1967 | Van Meter | .................... D7/357 |

(Continued)

OTHER PUBLICATIONS

NuTech Engraving, Personalized Items for that Special Occasion, May 5, 2006, http://www.webarchive.org/web/20060505201430/http://www.nutechengraving.com/ordering.html, pp. 1-5.*

(Continued)

*Primary Examiner*—Lesley Morris
*Assistant Examiner*—Kristina Staley
(74) *Attorney, Agent, or Firm*—Workman Nydegger (57) ABSTRACT

Embodiments relate to food-product preparation kits and food-product preparation apparatuses. In one embodiment, a food-product preparation kit includes at least one support including a plurality of support slots, a food-product preparation apparatus, and at least one recipe card. The food-product preparation apparatus includes a base and walls attached to the base. The base and walls define receiving spaces for receiving food product. The food-product preparation apparatus includes at least one flange portion extending from the base. The at least one flange is configured to be received by at least one support slot and cooperate therewith so that the food-product preparation apparatus is supported in an upward fashion at a convenient viewing angle. The at least one recipe card is configured to be received by at least one of the support slots and cooperate therewith so that the at least one recipe card is oriented in an upward fashion.

34 Claims, 11 Drawing Sheets

U.S. PATENT DOCUMENTS

| | | | |
|---|---|---|---|
| 3,943,840 A | | 3/1976 | Bolte |
| 3,971,118 A | | 7/1976 | Holmqvist |
| 4,014,451 A | | 3/1977 | Cannon et al. |
| 4,163,497 A | * | 8/1979 | McEwen ................ 211/11 |
| D253,332 S | * | 11/1979 | Rich ..................... D7/357 |
| 5,105,725 A | | 4/1992 | Haglund |
| 5,232,609 A | | 8/1993 | Prevost et al. |
| D364,995 S | * | 12/1995 | Koziol ................... D7/409 |
| 5,487,330 A | | 1/1996 | Mooney |
| 5,690,019 A | | 11/1997 | Barker et al. |
| 6,123,972 A | | 9/2000 | Matthews et al. |
| 2002/0178929 A1 | * | 12/2002 | Davis et al. .................. 99/426 |
| 2005/0193899 A1 | * | 9/2005 | DeBlassie et al. ............ 99/426 |
| 2008/0156955 A1 | * | 7/2008 | Koullouros .............. 248/441.1 |

OTHER PUBLICATIONS

Wilton, The Wilton Store, Aug. 12, 2006, http://web.archive.org/web/20060812180437/http://www.wilton.com/store/site/department.cfm?id=44EA0E64-475A-BAC0-563F8B88DB2D0895&fid=44EA0E74-475A-BAC0-58AA0AB3E2EA44FB, pp. 1-2.*

* cited by examiner

FOOD-PRODUCT PREPARATION KIT, FOOD-PRODUCT PREPARATION APPARATUS, AND METHODS OF USE

BACKGROUND

A variety of cooking implements are currently available for preparing and/or baking food products. For example, muffin trays, bread pans, and general baking pans are widely used for preparing and/or baking food products. More specialized baking pans, such as biscotti pans, are also available for shaping and baking biscotti or other similar food products. Despite the availability of a wide variety of cooking implements, manufacturers and users of cooking implements can appreciate a need for improved cooking implements that better serve the needs of the user.

SUMMARY

Embodiments of invention relate to food-product preparation kits, food-product preparation apparatuses, and methods of preparing food using such kits and apparatuses. In one embodiment of the invention, a food-product preparation kit includes at least one support including a plurality of support slots, a food-product preparation apparatus, and at least one recipe card. The food-product preparation apparatus includes a base and a plurality of walls attached to the base. The base and walls define a plurality of receiving spaces for receiving food product therein. The food-product preparation apparatus further includes at least one flange portion extending from the base. The at least one flange is configured to be received by at least one of the support slots and cooperate therewith so that the food-product preparation apparatus is oriented to extend upwardly from the at least one support. The at least one recipe card is configured to be received by at least one of the support slots and cooperate therewith so that the at least one recipe card is oriented to extend upwardly from the at least one support.

In another embodiment of the invention, a food-product preparation apparatus including a base having a back surface with at least one food recipe positioned thereon for a food product. A plurality of walls may be attached to the base, with the base and walls defining a plurality of receiving spaces for receiving food product. At least one flange portion extends from the base and includes at least one mount.

BRIEF DESCRIPTION OF THE DRAWINGS

The drawings illustrate several embodiments of the invention, wherein like reference numerals refer to like elements or features in different views or embodiments shown in the drawings.

DETAILED DESCRIPTION

Embodiments of invention relate to food-product preparation kits, food-product preparation apparatuses, and methods of preparing food products using such kits and apparatuses. Referring to FIGS. 1-4, a food-product preparation kit 100 includes a support 102 having a plurality of spaced slots 104. For example, the support 102 may be a plate formed from a metallic material, a polymeric material, or another suitable material having the slots 104 machined or molded therein.

Still referring to FIGS. 1-4, the food-product preparation kit 100 further includes a food-product preparation apparatus 106 that comprises a base 108 and a plurality of longitudinally-extending walls 110, with each pair of adjacent walls 110 and the base 108 collectively defining a plurality of receiving spaces 112 (e.g., channels) for providing receiving food product therein that may have open ends. In some embodiments, a plurality of walls (not shown) that extend transversely to the walls 110 may be provided to close one or both ends of the respective receiving spaces 112, as desired for preparing different types of food products. The food-product preparation apparatus 106 further includes a flange portion 114 extending transversely to the walls 110, which may be dimensioned of sufficient size so that a user may manually grasp the flange portion 114 to allow positioning the food-product preparation apparatus 106. The flange portion 114 may include one or more mounts 115 (FIG. 4), such as one or more through holes, suitable for hanging the food-product preparation apparatus 106 from a nail, hook, or other suitable mounting device. Instead of a through hole, in other embodiments of the invention, the mount 115 may be a bracket that is separately formed and joined to the flange portion 114 on a back side thereof or integrally formed with the flange portion 114.

The food-product preparation apparatus 106 may be formed from a variety of different materials. For example, the food-product preparation apparatus 106 may be formed from a suitable aluminum alloy having an anodized surface finish (e.g., a "hard coat" anodized surface) that is sufficiently smooth and wear resistant so that baked food products can be easily removed after baking. Additionally, the food-product preparation apparatus 106 may be compatible with use in an oven and being washed in a dishwashing machine. The anodized surface may be clear or colored, and may aid in the release of baked food products. In some embodiments of the invention, the base 108, walls 110, and flange portion 114 may be integrally formed as a unitary piece. In other embodiments of the invention, the base 108, walls 110, and flange portion 114 may be separate pieces that are joined together, such as by joining together using a welding process or another suitable joining technique.

Still referring to FIGS. 1-4, the food-product preparation kit 100 further includes one or more recipe cards 116 including a surface 117 having at least one food recipe 118 positioned thereon. The food recipe 118 is a recipe for a food product capable of being prepared in the food-product preparation apparatus 106. For example, the food recipe 118 may be a recipe for a food product that the food-product preparation apparatus 106 is specifically designed to be prepared in. The food recipe 118 may be, for example, a recipe for cookies, biscotti, mandel bread, bread sticks, focacia bread, and many other types of food products. The food recipe 118 may be provided on the surface 117 by engraving, embossing, anodizing, etching, laser marking, sandblasting, dying, dye sublimation anodizing, an adhesive label, or another suitable marking method. In some embodiments, a plurality of food recipes 118 may be provided on the surface 117, each of which may be a different recipe for a different food.

Figure 1:
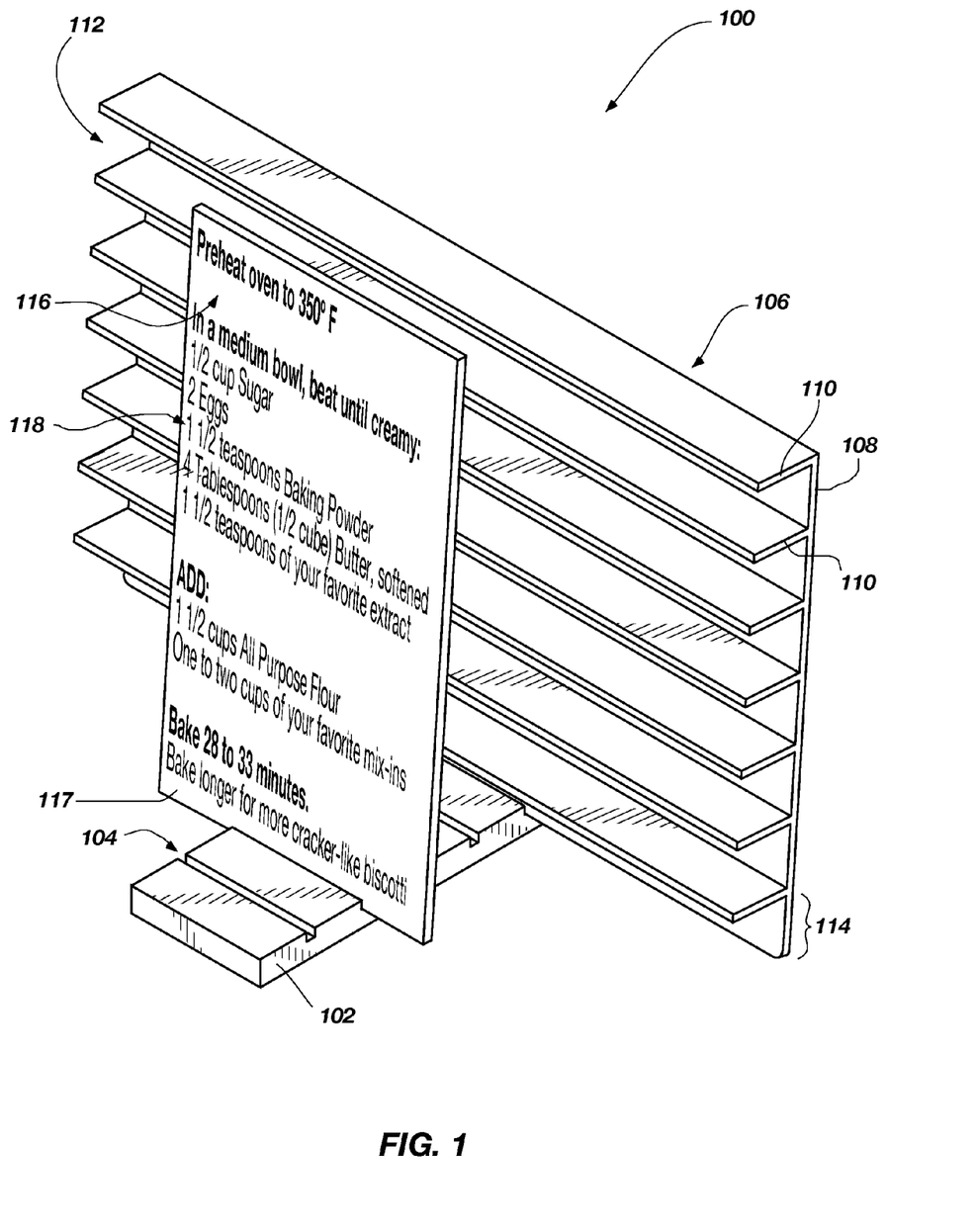
FIG. 1 is an isometric view of a food-product preparation kit including according to one embodiment of the invention.
Figure 2:
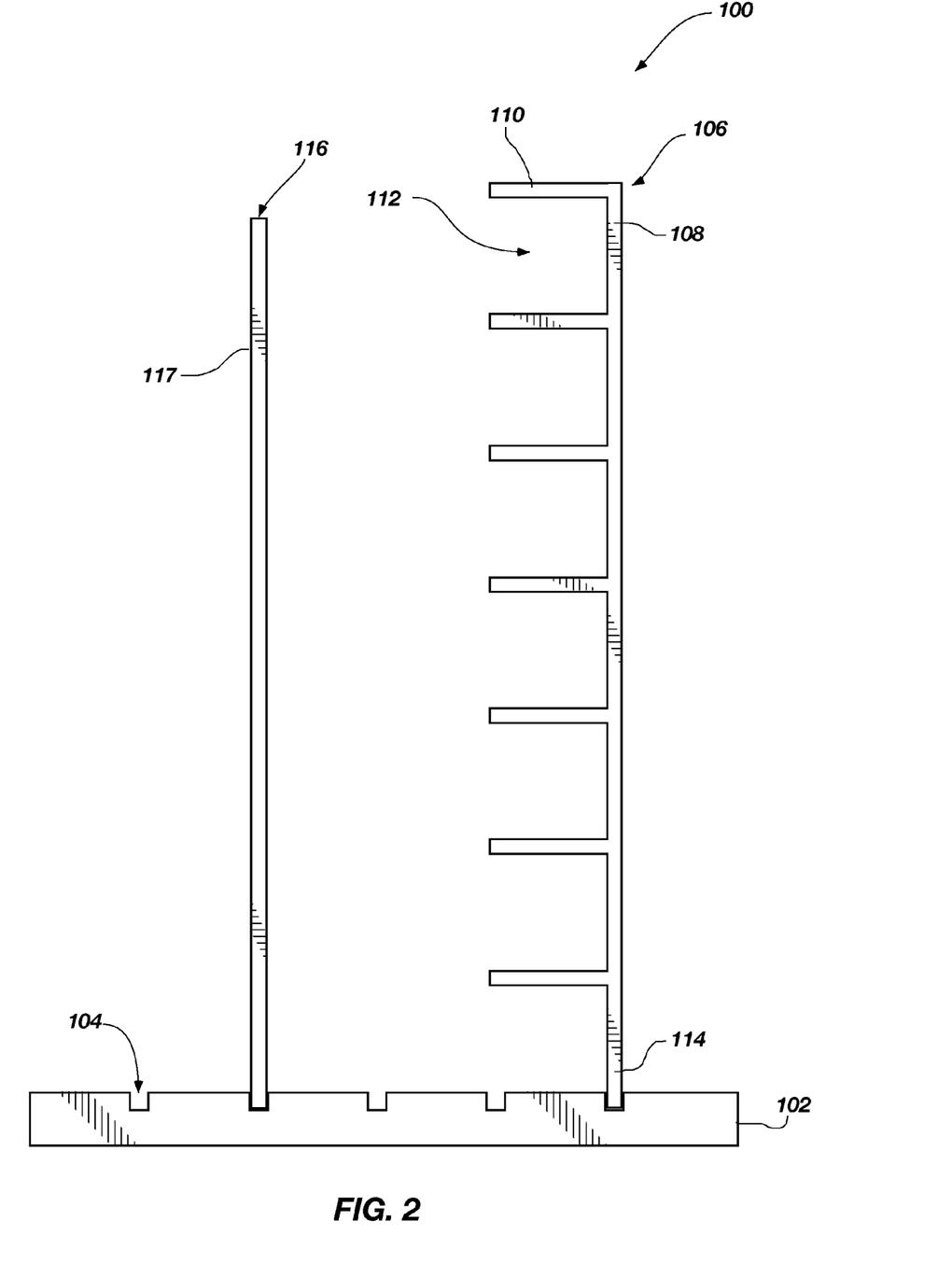
FIG. 2 is a side elevation view of the food-product preparation kit shown in FIG. 1.
Figure 3:
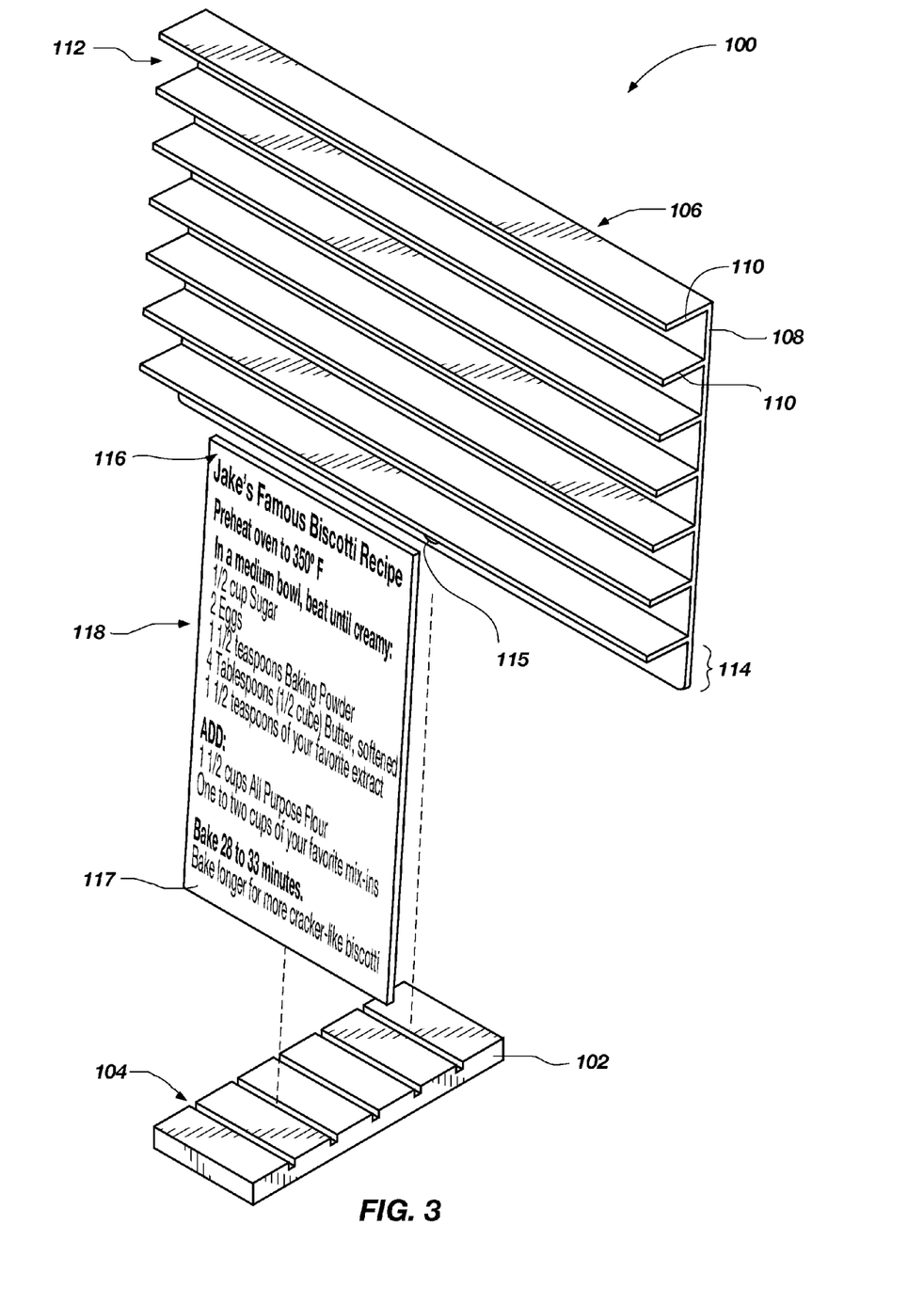
FIG. 3 is an exploded isometric view of the food-product preparation kit shown in FIG. 1.
Figure 4:
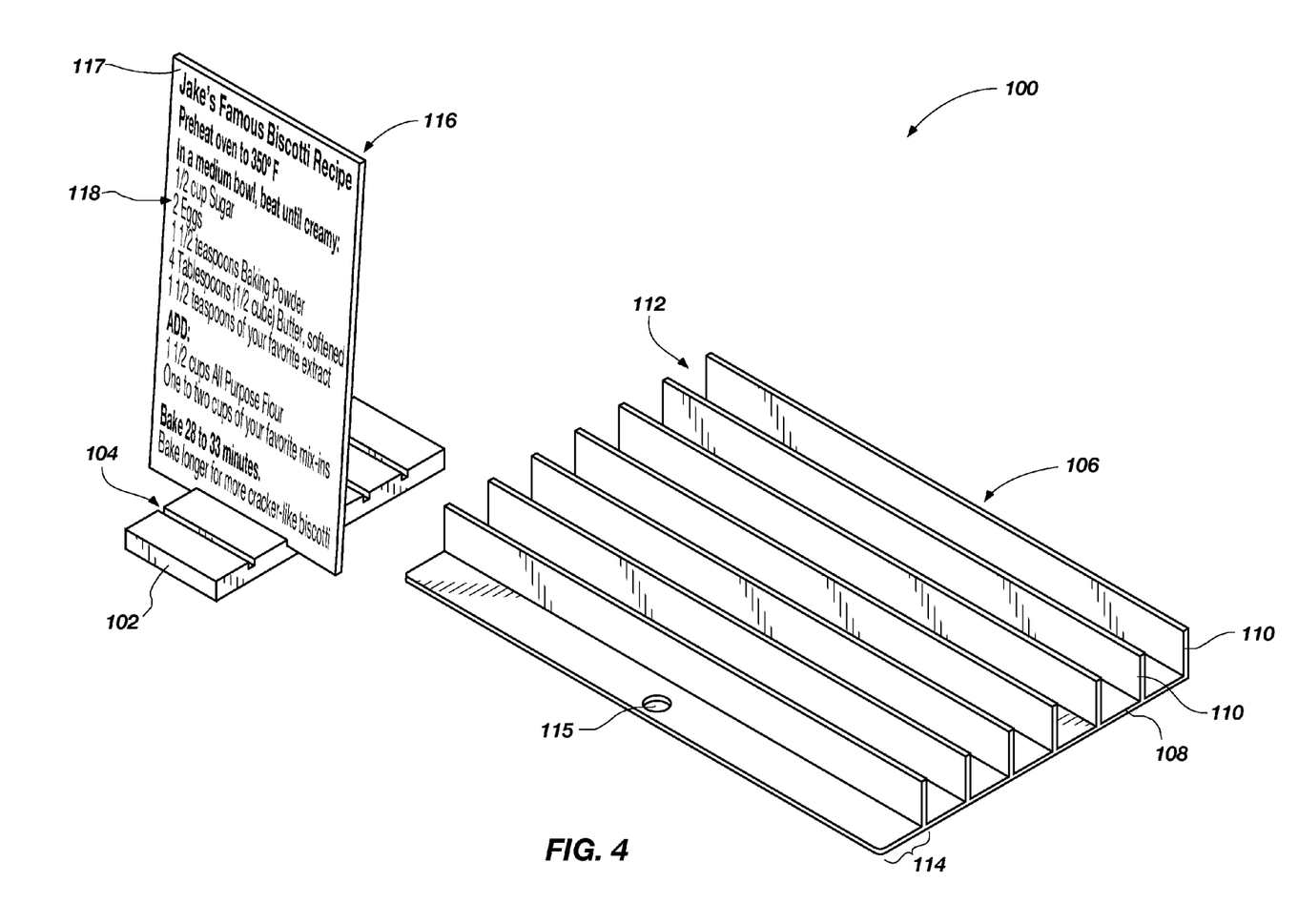
FIG. 4 is the food-product preparation kit shown in FIG. 1, with a food-product preparation apparatus to one side of a support.

The recipe card 116 is configured to be inserted into one of the slots 104 of the support 102 with the food recipe 118 thereof oriented right-side up at a convenient viewing angle (e.g., vertical or at an angle from the vertical) to be readily readable by a user. The food-product preparation apparatus 106 is also configured to be supported by the support 102. The flange portion 114 of the food-product preparation apparatus 106 is configured to be inserted into one of the slots 104 of the support 102 to support the food-product preparation apparatus 106. Thus, when assembled as shown in FIG. 1, the recipe card 116 may be supported at a convenient viewing angle (e.g., vertical or at an angle from the vertical) with the food recipe 118 easily readable by a viewer.

Although only one support 102 is shown in FIGS. 1-4, in other embodiments, two or more of the supports 102 may be employed to provide increased mechanical stability for supporting the recipe card 116 and food-product preparation apparatus 106.

Figure 5:
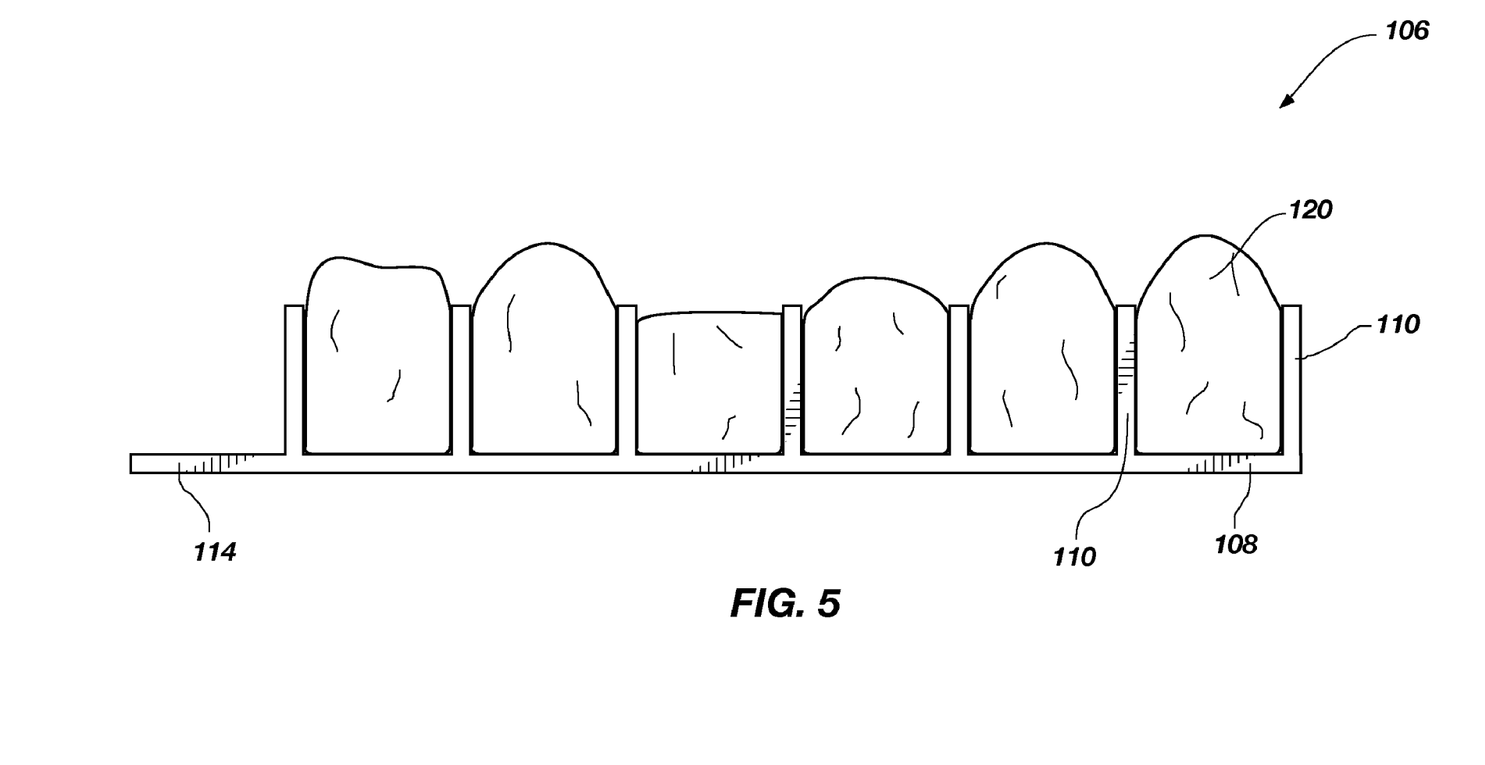
FIG. 5 is a side elevation view of the food-product preparation apparatus shown in FIGS. 1-4 having food product that has been provided into the receiving spaces.

Referring to FIG. 5, a user may provide a food product 120 to be prepared in one or more of the receiving spaces 112. For example, the food product 120 may be provided in the receiving spaces 112 by using a spatula, spoon, fork, pipe, an automated dispensing machine, or other cooking implement and prepared in accordance with the food recipe 118 on the recipe card 116. Depending upon the type of food product being prepared, after providing the food product 120, the food-product preparation apparatus 106 may be placed in an oven to bake the food product 120. For example, for bread and biscotti, the food product 120 may be a mixture prepared in accordance with the food recipe 118 of the recipe card 116 and baked in an oven in further accordance with the food recipe 118. The user may chose to leave the recipe card 116 positioned in one of the slots 104 of the support 102 with the recipe 118 conveniently oriented and prepare the food product 120 in accordance with the recipe 118.

Figure 6:
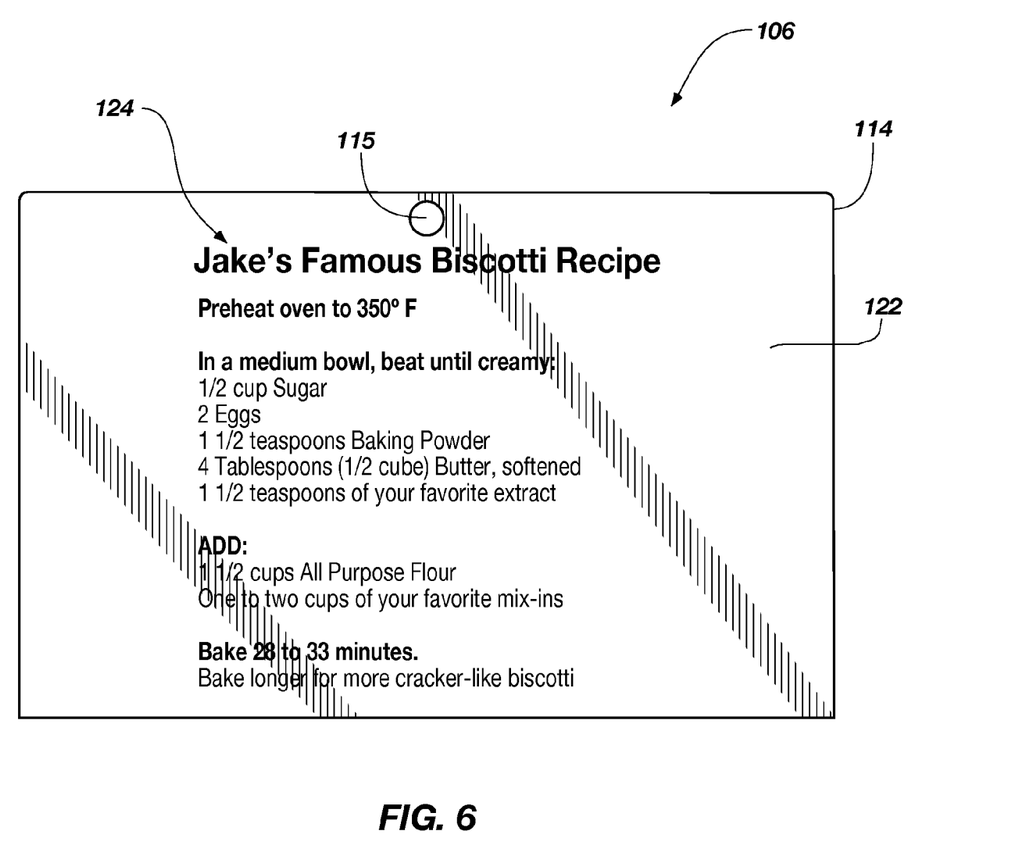
FIG. 6 is a plan view of a backside of the food-product preparation apparatus shown in FIGS. 1-4.

Referring to FIG. 6, in one embodiment of the invention, the food-product preparation apparatus 106 includes a back surface 122 having a food recipe 124 positioned thereon for a food product capable of being prepared in the food-product preparation apparatus 106. The food recipe 124 may be formed on the back surface 122 using engraving, embossing, anodizing, etching, laser marking, sandblasting, dying, dye sublimation anodizing, adhering an adhesive label, or another suitable marking method that is compatible with cooking temperatures in an oven and use in a dishwashing machine. The food recipe 124 is oriented on the back surface 122 so that when the food-preparation apparatus 106 is hung, such as using a nail, pin, hook, or other mounting device that extends through the through hole 115 of the flange portion 114, the food recipe 124 is oriented right-side up to be easily readable by the user.

In other embodiments of the invention, as an alternative or in addition to the food recipe 124, a logo (e.g., a logo associated with a distributor, supplier, or manufacturer of the food-product preparation kit 100), name of distributor of the food-product preparation kit 100, name of supplier of the food-product preparation kit 100, name of manufacturer of the food-product preparation kit 100, customized pictures and/or writing related to a wedding, anniversary, birthday, combinations of any of the foregoing, or other marking may be positioned on the back surface 122 and oriented right-side up when the food-product preparation apparatus 106 is hung via the through hole 115. Furthermore, in other embodiments of the invention, as an alternative or in addition to the food recipe 124, a logo (e.g., a logo associated with a distributor, supplier, or manufacturer of the food-product preparation kit 100), name of distributor of the food-product preparation kit 100, name of supplier of the food-product preparation kit 100, name of manufacturer of the food-product preparation kit 100, customized pictures and/or writing related to a wedding, anniversary, birthday, recipe, combinations of any of the foregoing, or other marking may be positioned on a surface of the flange portion 114.

Figure 7:
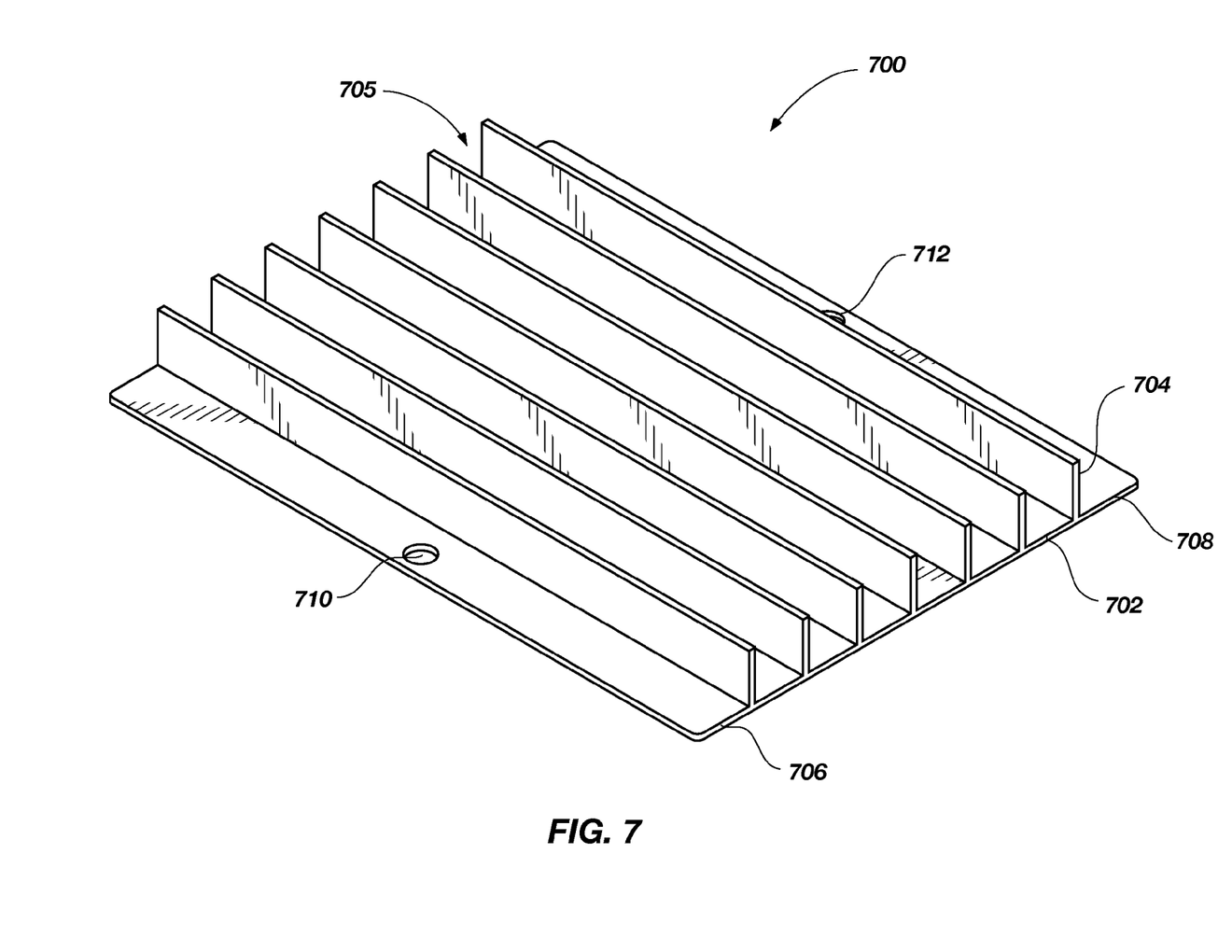
FIG. 7 is an isometric view of a food-product preparation apparatus including first and second flange portions according to another embodiment of the invention.

There are a multitude of other embodiments for food-product preparation apparatuses. For example, referring to FIG. 7, a food-product preparation apparatus 700 includes a base 702 having longitudinally-extending walls 704 attached thereto, which collectively define a plurality of receiving spaces 705. A first flange portion 706 extends from the base 702 and a second flange portion 708 extends from the base 702 in an opposing direction. In the illustrated embodiment, the first flange portion 706 includes one or more through holes 710 and the second flange portion 708 includes one or more through holes 712. However, other types of mounts may be employed besides through holes, such as brackets.

Figure 8:
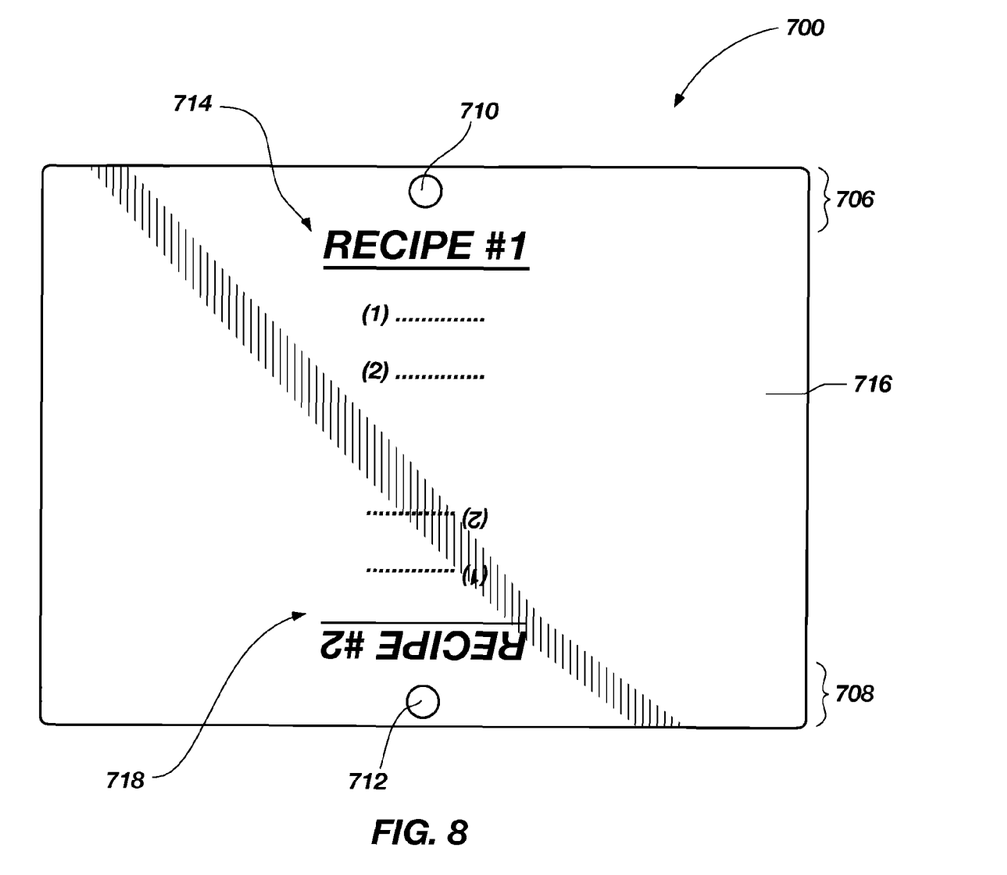
FIG. 8 is a plan view of a backside of the food-product preparation apparatus shown in FIG. 7.

Referring to FIG. 8, in the illustrated embodiment, a first food recipe 714 may be positioned on a back surface 716 of the food-product preparation apparatus 700 and oriented so that when the food-product preparation apparatus 700 is hung via the through hole 710, the first food recipe 714 is oriented right-side up. In the illustrated embodiment, a second food recipe 718 may also be positioned on the back surface 716 of the food-product preparation apparatus 700 and oriented so that when the food-product preparation apparatus 700 is hung via the through hole 712, the second food recipe 718 is oriented right-side up. In other embodiments of the invention, a logo (e.g., a logo associated with a distributor, supplier, or manufacturer), name of distributor, name of supplier, name of manufacturer, combinations of the foregoing, or other marking may be used in addition to or as an alternative to the second food recipe 718.

Figure 9:
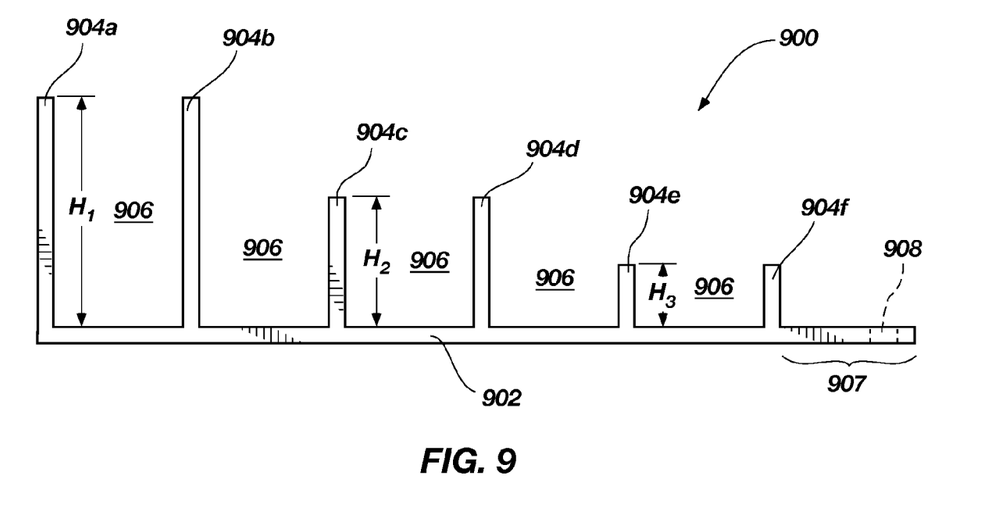
FIG. 9 is a side elevation view of a food-product preparation apparatus in which a portion of the receiving spaces for receiving food product have different height according to another embodiment of the invention.

Referring to FIG. 9, in another embodiment of the invention, a food-product preparation apparatus 900 includes a base 902 having walls 904 attached thereto, which collectively define receiving spaces 906. At least a portion of the walls 904 may have different heights for forming food-products of different heights. For example, in the illustrated embodiment, the walls 904a and 904b have a height $H_1$, the walls 904c and 904d have a height $H_2$, and the walls 904e and 904f have a height $H_3$. Providing receiving spaces of different heights facilitates preparing food products of different heights. However, it is contemplated that other variation in heights for the receiving spaces 906 may be provided in any of the other embodiments of the invention disclosed herein. In the illustrated embodiment, the food-product preparation apparatus 900 may include a flange portion 908 extending from the base 902 that includes one or more through holes 910 for hanging the food-product preparation apparatus 900 or for using the food-product preparation apparatus 900 in conjunction with the support 102 shown in FIGS. 1-4. However, the flange portion 908 may be omitted. It should be noted, that although not shown, one or more food recipes, markings (logos, names, etc.) may be provided a back surface the base 902 as previously described with respect to the other food-product preparation apparatus embodiments.

Figure 10A:
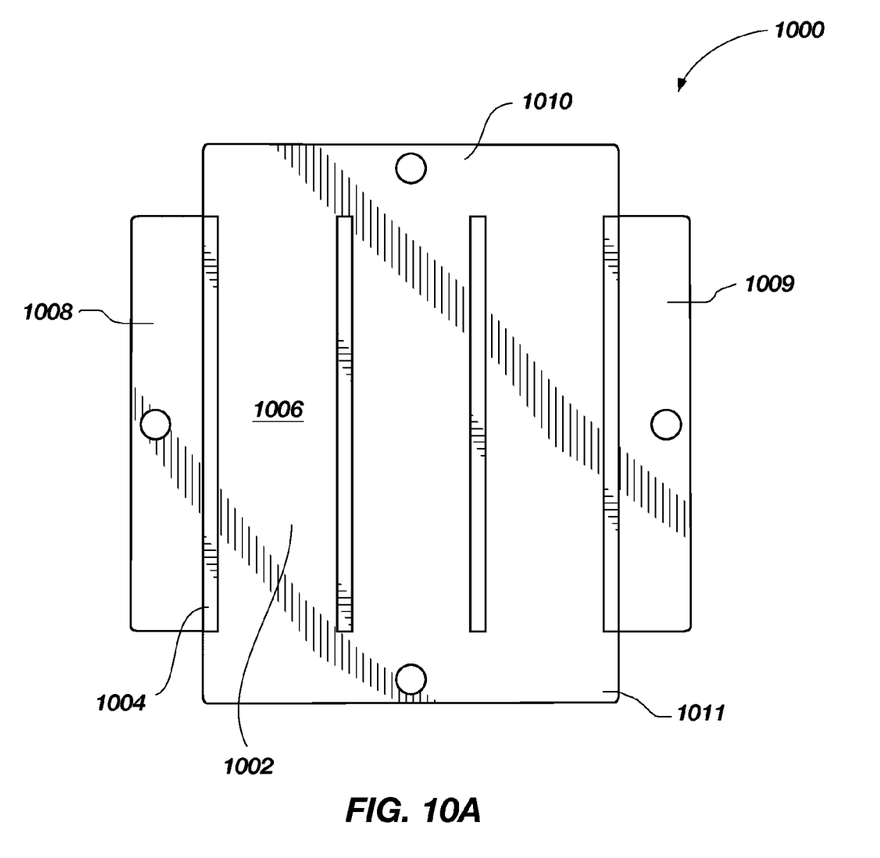
FIG. 10A is a top plan view of a food-product preparation apparatus that includes more than two flanges according to another embodiment of the invention.
Figure 10B:
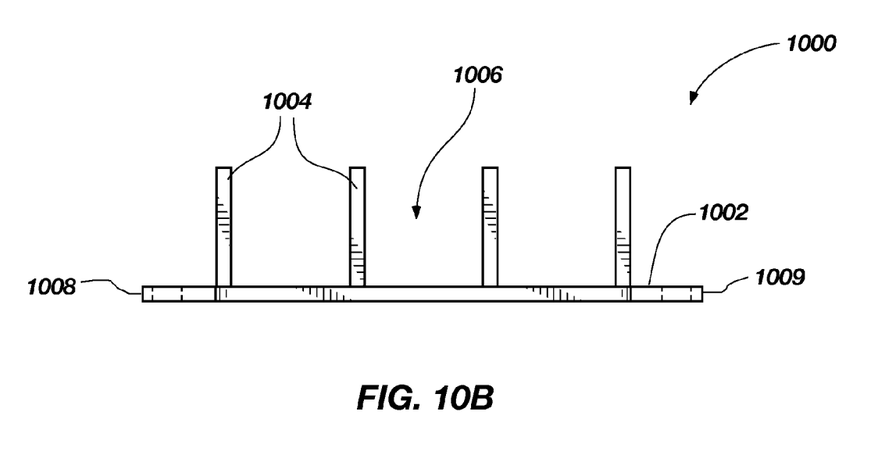
FIG. 10B is a side elevation view of the food-product preparation apparatus shown in FIG. 10A.
Figure 10C:
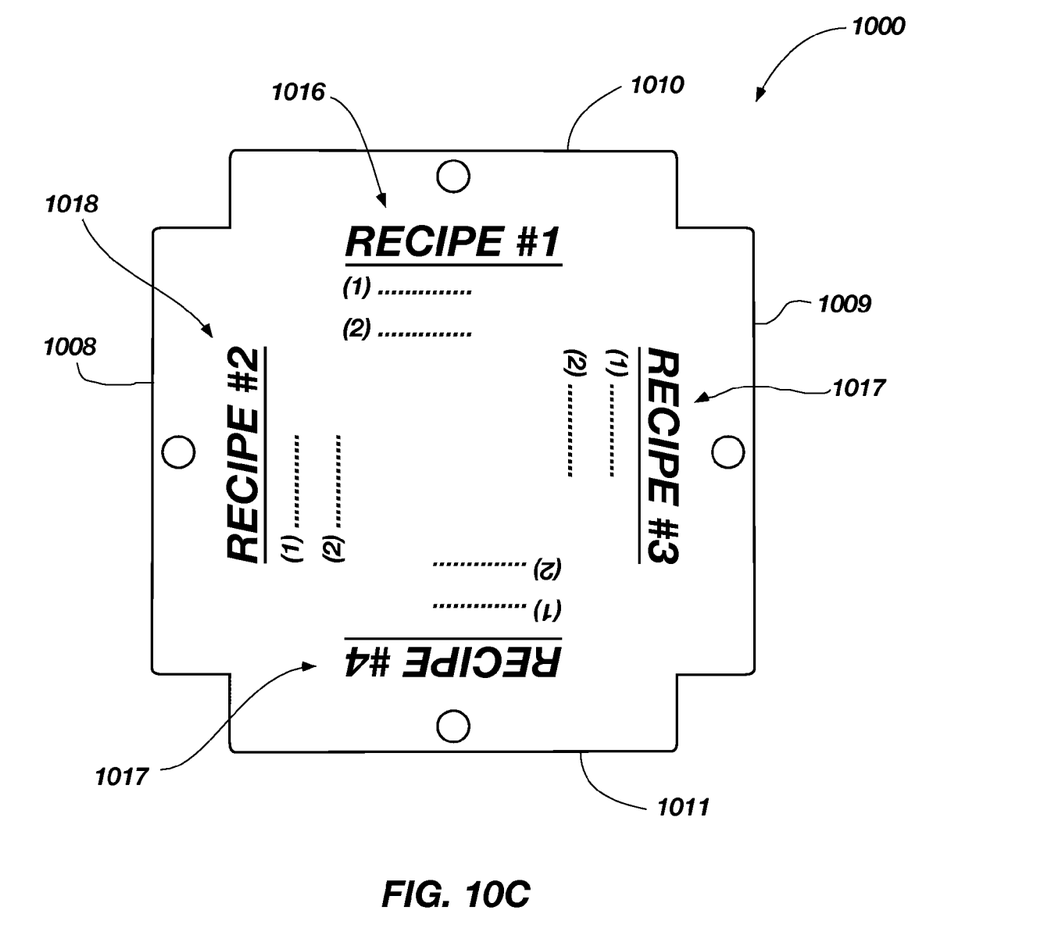
FIG. 10C is a rear plan view of the food-product preparation apparatus shown in FIG. 10A.

Referring to FIGS. 10A-10C, in yet another embodiment of the invention, a food-product preparation apparatus 1000 includes a base 1002 having a plurality of walls 1004 attached thereto that may be similar in construction to any of the previously described embodiments. The base 1002 and walls 1004 define a plurality of receiving spaces 1006 for receiving food product therein. In addition to flange portions 1008 and 1009 that extend from the base 1002, the food-product preparation apparatus 1000 also includes flange portions 1011 and 1012. Each flange portion 1008-1011 may be configured to be received in one of the slots 104 of the support 102 shown in FIGS. 1-4. At least one of, a portion of, or all of the flange portions 1008-1011 may include a mount (e.g., a through hole or bracket). For example, in the illustrated embodiment, each flange portion 1008-1011 includes a through hole 1012 for hanging the food-product preparation apparatus 1000 in a particular orientation. A back surface 1014 (FIG. 10C) of the base 1002 may include food recipes 1016-1019 positioned thereon and/or markings that are oriented right-side up only when hung or supported by a specific one of the flange portions 1008-1011. It should be noted that mounts do not need to be provided on each flange portion 1008-1011 and other embodiments are contemplated in which, for example, only one, two, or three of the flange portions 1008-1011 have a mount.

In any of the described food-product preparation apparatuses, a width of a portion of the receiving spaces of a food-product preparation apparatus may be different. For example, at least one, a portion of, or each of the receiving spaces may have a different width. Providing receiving spaces of different widths facilitates preparing food products of different widths.

Although the invention has been disclosed and described by way of some embodiments, it is apparent to those skilled in the art that several modifications to the described embodiments, as well as other embodiments of the invention are possible without departing from the spirit and scope of the invention.

The invention claimed is:

1. A food-product preparation kit, comprising:
   at least one support including a plurality of support slots;
   a food-product preparation apparatus including:
      a base including a first end and an opposing second end;
      a plurality of walls attached to the base, the base and the walls defining a plurality of receiving spaces; and
   at least one flange portion extending from the base, the at least one flange configured to be received by at least one of the support slots and cooperate therewith so that the food-product preparation apparatus is oriented to extend upwardly from the at least one support, the at least one flange portion of the food-product preparation apparatus comprises a first flange portion having a first mount and a second flange portion having a second mount, the first flange portion extending from the first end and the second flange portion extending from the second end; and
   at least one recipe card configured to be received by at least one of the support slots and cooperate therewith so that the at least one recipe card is oriented to extend upwardly from the at least one support.

2. The food-product preparation kit of claim 1 wherein the at least one recipe card comprises a surface including at least one food recipe positioned thereon that is viewable when the at least one recipe card is supported by the at least one support.

3. The food-product preparation kit of claim 1 wherein the base of the food-product preparation apparatus comprises a back surface including at least one food recipe positioned thereon for a food product that the food-product preparation apparatus is specifically designed to be prepared in.

4. The food-product preparation kit of claim 3 wherein the at least one food recipe is engraved, embossed, anodized, laser marked, sandblasted, dyed, dye sublimation anodized, or etched.

5. The food-product preparation kit of claim 1 wherein the first and second mounts are each a through hole or a bracket.

6. The food-product preparation kit of claim 1 wherein the base of the food-product preparation apparatus comprises a back surface including:
   a first marking positioned thereon and oriented right-side up when the food-product preparation apparatus is hung from the first mount; and
   a second marking positioned on the back surface and oriented right-side up when the food-product preparation apparatus is hung from the second mount.

7. The food-product preparation kit of claim 6 wherein the first marking comprises a first food recipe and the second marking comprises a second food recipe.

8. The food-product preparation kit of claim 6 wherein the first marking comprises a first food recipe and the second marking comprises a logo associated with a distributor of the food-product preparation kit.

9. The food-product preparation kit of claim 1 wherein the at least one flange portion of the food-product preparation apparatus extends generally in the plane of the base.

10. The food-product preparation kit of claim 1 wherein the at least one flange portion of the food-product preparation apparatus comprises a through hole for hanging the food-product preparation apparatus.

11. The food-product preparation kit of claim 1 wherein the at least one flange portion is integrally formed with the base.

12. The food-product preparation kit of claim 1 wherein the at least one flange portion and the walls of the food-product preparation apparatus are integrally formed with the base.

13. The food-product preparation kit of claim 1 wherein at least a portion of the receiving spaces of the food-product preparation apparatus exhibit different respective heights.

14. The food-product preparation kit of claim 1 wherein at least a portion of the receiving spaces of the food-product preparation apparatus exhibit different respective widths.

15. The food-product preparation kit of claim 1 wherein each of the receiving spaces of the food-product preparation apparatus comprise first and second open ends.

16. A food-product preparation apparatus, comprising:
   a base including a back surface having at least one food recipe positioned thereon for a food product;
   a plurality of walls attached to the base, the base and the walls defining a plurality of receiving spaces, each of the receiving spaces including first and second open ends; and
   at least one flange portion extending from the base and including at least one mount.

17. The food-product preparation apparatus of claim 16 wherein:
   the at least one flange portion of the food-product preparation apparatus comprises a first flange portion extending from a first end of the base and a second flange portion extending from a second end of the base in an opposing direction from the first flange portion; and the at least one mount comprises a first mount and a second mount.

18. The food-product preparation apparatus of claim 17:
wherein at least one recipe is oriented right-side up when the food-product preparation apparatus is hung from the first mount; and
further comprising at least one marking positioned on the back surface and oriented right-side up when the food-product preparation apparatus is hung from the second mount.

19. The food-product preparation apparatus of claim 18 wherein the at least one marking comprises a food recipe.

20. The food-product preparation apparatus of claim 18 wherein the at least one marking comprises a logo associated with a distributor of the food-product preparation kit.

21. The food-product preparation apparatus of claim 16 wherein the at least one flange portion of the food-product preparation apparatus extends generally in the plane of the base.

22. The food-product preparation apparatus of claim 16 wherein the at least one flange portion is integrally formed with the base.

23. The food-product preparation apparatus of claim 16 wherein the at least one flange portion and the walls are integrally formed with the base.

24. The food-product preparation apparatus of claim 16 wherein the walls extend in a longitudinal direction.

25. The food-product preparation apparatus of claim 16 wherein the at least one food recipe is engraved, embossed, anodized, laser marked, sandblasted, dyed, dye sublimation anodized, or etched.

26. The food-product preparation apparatus of claim 16 wherein the at least one mount comprise at least one through hole.

27. The food-product preparation apparatus of claim 16 wherein the at least one mount comprise at least one bracket.

28. The food-product preparation apparatus of claim 16 wherein at least a portion of the receiving spaces exhibit different respective heights.

29. The food-product preparation apparatus of claim 16 wherein at least a portion of the receiving spaces exhibit different respective widths.

30. A food-product preparation kit, comprising:
at least one support including a plurality of support slots;
a food-product preparation apparatus including:
    a base including a back surface having at least one food recipe positioned thereon for a food product;
    a plurality of walls attached to the base, the base and the walls defining a plurality of receiving spaces, each of the receiving spaces including first and second open ends; and
    at least one flange portion extending from the base and including at least one mount, the at least one flange configured to be received by at least one of the support slots and cooperate therewith so that the food-product preparation apparatus is oriented to extend upwardly from the at least one support; and
at least one recipe card configured to be received by at least one of the support slots and cooperate therewith so that the at least one recipe card is oriented to extend upwardly from the at least one support.

31. A food-product preparation apparatus, comprising:
a base extending generally in a plane, the base including a back surface having at least one food recipe positioned thereon for a food product, the at least one food recipe being marked on the back surface by at least one of engraving, embossing, anodized, laser marking, sandblasting, dying, dye sublimation anodizing, or etching;
a plurality of walls attached to and integrally formed with the base, the base and the walls defining a plurality of receiving spaces, each of the receiving spaces including first and second open ends; and
at least one flange portion extending from and generally in the plane of the base, the at least one flange portion and the base being integrally formed with each other, the at least one flange including at least one mount, the at least one recipe being oriented right-side up when the food-product preparation apparatus is hung from the at least one mount.

32. The food-product preparation apparatus of claim 31 wherein:
the at least one flange portion comprises a first flange portion extending from a first end of the base and a second flange portion extending from a second end of the base in an opposing direction from the first flange portion; and
the at least one mount comprises a first mount and a second mount.

33. The food-product preparation apparatus of claim 31 wherein the at least one mount comprise at least one through hole.

34. The food-product preparation apparatus of claim 31 wherein the at least one mount comprise at least one bracket.

* * * * *

UNITED STATES PATENT AND TRADEMARK OFFICE
CERTIFICATE OF CORRECTION

| | | |
|---|---|---|
| PATENT NO. | : 7,861,442 B2 | Page 1 of 1 |
| APPLICATION NO. | : 12/079201 | |
| DATED | : January 4, 2011 | |
| INVENTOR(S) | : Ford et al. | |

It is certified that error appears in the above-identified patent and that said Letters Patent is hereby corrected as shown below:

On the Title Page, Item (75)
Inventors:, change "Larry A. Balley, Jr., Jacksonville, NC (US)" to --Larry A. Bailey, Jr., Jacksonville, NC (US)--

Signed and Sealed this
Fourth Day of October, 2011

David J. Kappos
*Director of the United States Patent and Trademark Office*